United States Patent [19]

Leibfritz et al.

[11] 3,831,953
[45] Aug. 27, 1974

[54] SOLENOID OPERATED VALVE ASSEMBLY

[75] Inventors: Kurt W. Leibfritz, Norridge; Lester W. Malinowski, Des Plaines, both of Ill.

[73] Assignee: Parker-Hannifin Corporation, Cleveland, Ohio

[22] Filed: Aug. 3, 1970

[21] Appl. No.: 67,662

Related U.S. Application Data

[62] Division of Ser. No. 5,410, Jan. 5, 1970, Pat. No. 3,633,624, which is a division of Ser. No. 664,191, Aug. 29, 1967, Pat. No. 3,487,848.

[52] U.S. Cl............................ 277/180, 277/212 F
[51] Int. Cl............................................. F16l 19/02
[58] Field of Search........ 277/212, 215, 235 B, 237, 277/180, 188

[56] References Cited
UNITED STATES PATENTS

| | | | |
|---|---|---|---|
| 1,789,030 | 1/1931 | Balfe | 277/235 B |
| 1,932,539 | 10/1933 | Victor | 277/235 B |
| 2,599,767 | 6/1952 | Long | 285/1 |
| 2,867,463 | 1/1959 | Snider | 288/19 |
| 3,168,321 | 2/1965 | Glicksman | 277/180 |
| 3,367,682 | 2/1968 | Meriano | 277/212 X |
| 3,463,196 | 8/1969 | Richardson | 138/96 |

*Primary Examiner*—Meyer Perlin
*Assistant Examiner*—Ronald C. Capossela
*Attorney, Agent, or Firm*—Donnelly, Maky, Renner & Otto

[57] ABSTRACT

A sealing unit adapted to be clamped between parallel faces of mating valve parts, comprising a sheet-like resilient gasket member engaged with one of said faces, and a uniform thickness plate member engaged with the other of said faces, said gasket member having aperatures bounded on one side only by lateral rib means which extend through aperatures in said plate member beyond the thickness thereof so that said gasket member is squeezed at the rib means between said parallel faces. The sealing unit herein is further characterized in that said gasket member has lateral projections extending through other apertures in said plate member into cavities in the mating valve part engaged by said plate member thus to locate said sealing unit between said mating parts.

6 Claims, 12 Drawing Figures

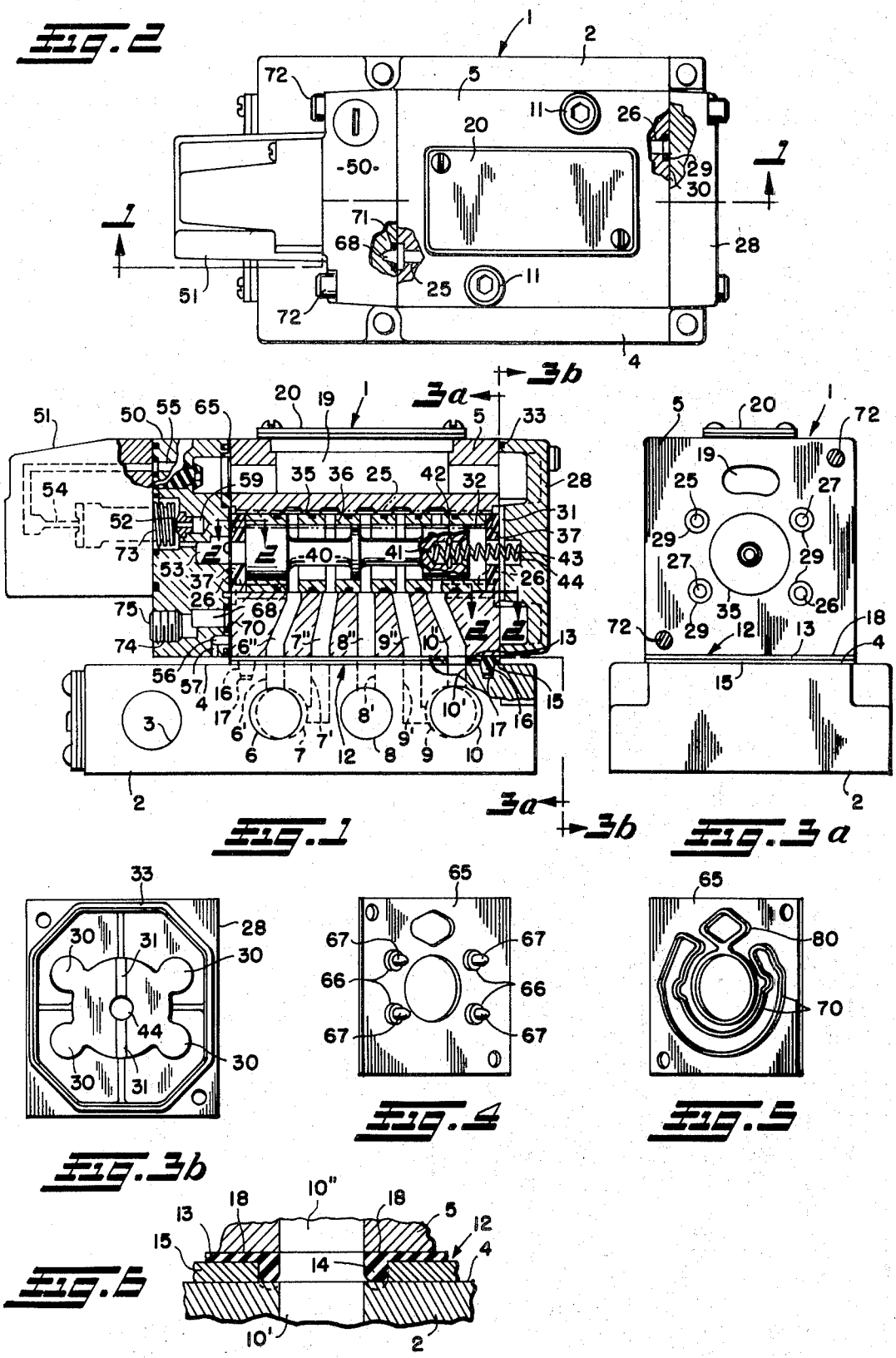

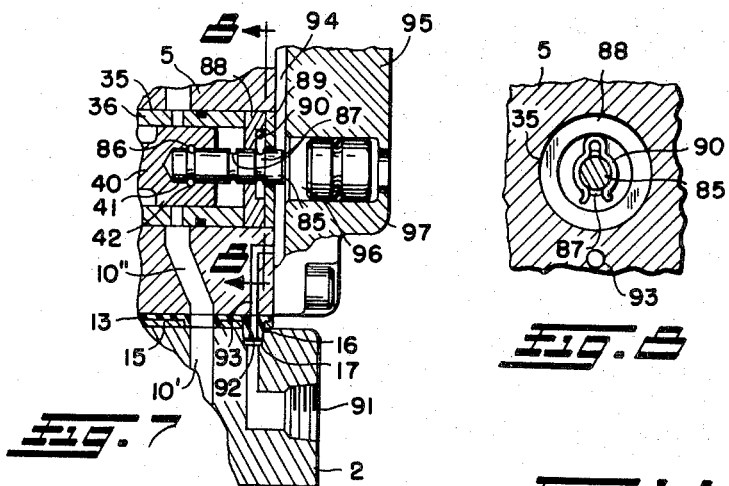
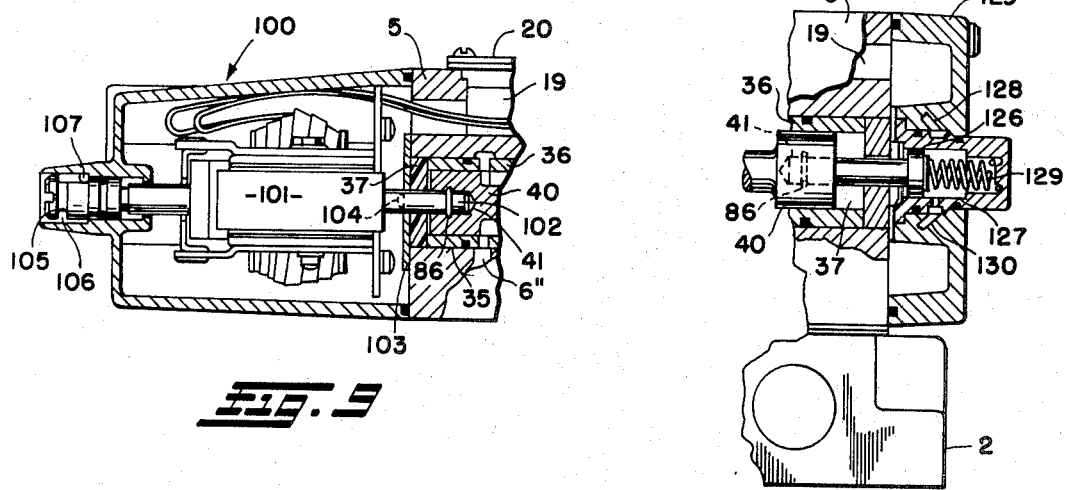
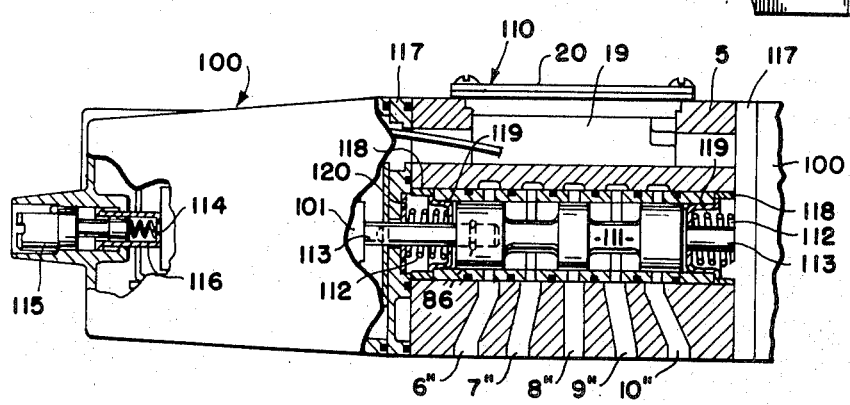

SOLENOID OPERATED VALVE ASSEMBLY

This is a division of application Ser. No. 5,410, filed Jan. 5, 1970 now U.S. Pat. No. 3,633,624, which in turn was a division of Ser. No. 664,191, filed Aug. 29, 1967 now U.S. Pat. No. 3,487,848.

BACKGROUND OF THE INVENTION

In the U.S. Pat. No. 3,171,435 to Z. J. Lansky et al., dated Mar. 2, 1965, there is disclosed a solenoid operated valve assembly of the built-up block type wherein there is provided: (1) a base or distributing block to which the piping and electrical supply cable connections are made; (2) a valve block detachably secured to said distributing block having an electric plug connection with an electric receptacle on the distributing block and having flow control passages registering with passages in the distributing block; and (3) a solenoid operated pilot valve assembly detachably connected to said valve block and having further passages arranged so that energization and de-energization of the solenoid effects actuation of a main valve member in said valve block, thus to set up desired fluid flow through the ports of the distributing block.

Reference may also be had to the U.S. Pat. No. 3,232,312 to Z. J. Lansky et al. dated Feb. 1, 1966 which shows in detail a preferred form of solenoid operated pilot valve which controls the actuation of a main valve disposed in the valve block. See also the U.S. Pat. No. 2,754,840 To F. W. Hicks, Jr. dated July 17, 1956.

SUMMARY OF THE INVENTION

It is a principal object of this invention to provide a solenoid operated valve assembly of the built-up block type which comprises the assembly of standardized components which can be assembled in various ways, with or without slight alterations, to provide many different valve combinations.

Specifically, it is one object of this invention to provide a new and simplified form of seal between plane faces of the valve block and the distributing block, the valve block further having plane ends to which caps, direct acting solenoids, or solenoid pilot valves may be selectively attached.

It is another object of this invention to provide a novel form of main valve spool which is reciprocable in a liner sleeve in the valve block and which has hollow ends to provide a cavity for a return spring at one end as, for example, in a four-way, two position valve wherein the other end of the spool is exposed to fluid pressure when the associated solenoid pilot valve is open; to provide for connection of an actuating rod in the cavity as in a four-way, two position valve wherein the solenoid armature acts directly on said rod to move said valve spool in the valve block; to provide for connection of a detent rod in the spool cavity which, in conjunction with a detent mechanism mounted in the bore of the valve block adjacent an end of the liner, holds the valve spool in its solenoid or pilot pressure actuated positions as, for example, in a four-way, two position valve.

It is another object of this invention to provide in a solenoid pilot operated valve assembly a valve block having a first through bore from end-to-end of said valve block which communicates with a first passage in the valve block and having second bores at the respective ends of said valve block which communicate with respective second passages in the valve block, and a unique form of gasket for mounting between either end of the valve block and the adjacent solenoid pilot valve housing, said gasket being molded in such form as to be readily modified to select spool actuating pressure from the adjacent end of said first bore or from the adjacent second bore.

It is a further object of this invention to provide a novel form of valve block-distributing block gasket which can readily be modified for remote supply of spool actuating pressure via passages in the gasket and in said blocks.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

BRIEF DESCRIPTION OF THE DRAWING

FIG. 1 is a cross-section view along line 1—1, FIG. 2 of one form of valve assembly embodying the present invention;

FIG. 2 is a top plan view of FIG. 1 with partial sections at the lines 2—2, FIG. 1;

FIGS. 3a and 3b are end elevation views of the valve block and of the end cap as viewed along the respective lines 3a and 3b, FIG. 1;

FIG. 4 is a perspective view of the pilot valve housing-valve block gasket as viewed from the valve block side thereof, said gasket being shown in its molded condition prior to removal of any of the four plugs thereof which fit in the four counter-bored openings at the end of the valve block;

FIG. 5 is a perspective view of the pilot valve housing side of the FIG. 4 gasket;

FIG. 6 is a much enlarged fragmentary cross-section view of the gasket assembly employed between the valve block and the distributing block;

FIG. 7 is a fragmentary cross-section view of a detent mechanism for yieldably holding the valve spool in either actuated position;

FIG. 8 is a detail view along line 8—8, FIG. 7 showing the hairpin type detent element;

FIG. 9 is a fragmentary cross-section view of a valve assembly similar to FIG. 1 except that the valve spool is shifted directly by a solenoid armature;

FIG. 10 is a fragmentary cross-section view of a four-way three position valve in which the valve spool is spring-centered and is actuated in one direction or the other from such center position through actuating rods engaged by the adjacent solenoid armatures; and FIG. 11 is a fragmentary cross-section view of a four-way two position valve which has a piston smaller than the spool diameter connected at one end of the spool for fluid pressure return of the spool.

DESCRIPTION OF THE PREFERRED EMBODIMENTS

Referring now in detail to the drawings, and first to FIGS. 1 to 6 thereof, the solenoid operated valve assembly 1 comprises a distributing block 2 having an electric cable or conduit connection port 3 which as shown in the aforesaid Lansky et al. U.S. Pat. No. 3,171,435, leads through a cored passage in the distributing block 2 and terminates in an opening at the face 4 which registers with a similar opening in the valve block 5. Said openings will be provided with mating plug and socket elements which are automatically disconnected upon removal of the valve block 5 from the distributing block 2. Said distributing block 2 as herein shown has five ports 6, 7, 8, 9, and 10 which communicate with the respective passages 6', 7', 8', 9', and 10' all terminating in the upper face 4 of the distributing block 2. When the valve 1 is used as a dual exhaust valve, the ports 6 and 10 are exhaust ports and the center port 8 is the pressure inlet port, and the two ports 7 and 9 on the rear side of the distributing block 2 are cylinder ports connected to opposite ends of a double acting cylinder. On the other hand, when the valve 1 is of the dual pressure type the two ports 6 and 10 are pressure ports and the center port 8 is the exhaust port whereby a double acting cylinder connected with the ports 7 and 9 may be actuated in opposite directions from two pressure sources of equal of unequal magnitude.

The valve block 5 is secured as by the screws 11 to the upper side of the distributing block 2 and has passages 6'', 7'', 8'', 9'', and 10'' registering with the respective passages 6', 7', 8', 9', and 10' of the distributing block 2. Interposed between the valve block 5 and the distributor block 2 is a seal assembly 12 which, as best shown in FIGS. 1 and 6, comprises a molded sheet 13 of rubber-like material having apertures registering with passages 6'–6'' to 10'–10'' and having rib means 14 encircling the respective registering passages 6'–6'' to 10'–10'', said rib means 14 being axially thicker than the plate 15 through which the respective rib means 14 extend. The gasket 13 will be provided with holes through which the screws 11 extend, and adjacent each end thereof, the gasket 13 is provided with plug elements 16 which are a snug fit in corresponding holes in plate 15 and in the respective blind holes 17 formed in the upper surface 4 of the distributing block 2. It can thus be seen that when the screws 11 are tightened, the rib means 14 are axially compressed between the flat faces 4 and 18 of the distributing block 2 and the valve block 5, thus to establish fluid-tight joints isolating the passages 6' to 10' and 6'' to 10'' from each other and preventing leakage of fluid from the valve assembly 1. In FIG. 6 the dotted lines denote the original molded condition of the rib means 14 of the gasket 13.

The valve block 5 is provided with a cavity 19 closed by the removable cover 20 in which solenoid connections (not shown) are made.

The valve block 5 has a first through bore 25 extending axially therethrough from one end to the other and, at its center, communicating only with the center passage 8''. Diagonally opposite said through bore 25, each end of the valve block 5 has a bore 26 which is in communication with the respective end passage 6'' and 10'' of the valve block 5 for a purpose which will presently appear. There are also two other diagonally opposite blind bores 27;27 at each end of valve block 5 which form with the through bore 25 and the aforesaid shorter bore 26, a rectangular arrangement as best shown in FIG. 3a. All of these openings 25;26, and 27;27 are counterbored as shown to receive, in the case of the use of an end cap 28, at either end of the valve block 5 O-rings 29 which seat against a plane end face 30 of said cap 28. The cap 28 is provided with a groove 31 which vents the spool bore 32 into the electrical chamber 19. A packing ring 33 in a groove of cap 28 seals the cap 28-valve block 5 joint.

The valve block 5 has a central through bore 35 which is preferably of uniform diameter from end to end and which intersects all five of the aforesaid passages 6'' to 10''. Within said bore 35 is a packed liner sleeve 36 which is slotted as shown to register with the respective passages 6'' to 10'', the sleeve 36 being held in axially centered position by means of the apertured spacer and bumper disks 37 which preferably are approximately flush with the ends of the valve block 5 when the sleeve 36 is assembled therebetween.

Reciprocable within the liner sleeve is a valve spool 40 which has a blind cavity 41 at each end with an undercut 42 for a purpose which will hereinafter appear. When a cap 28 is used as shown in FIGS. 1, 2, and 3, the spool return spring 43 will be disposed in the spool cavity 41 and in a cavity 44 in the end cap 28. If the center port 8 is a pressure inlet port, it can be seen that when the spool 40 is in the position shown, fluid pressure will be conducted to the cylinder port 9 at the right rear side of the distributor block 2 via the passages 8' and 8'' and 9'' and 9', and the other cylinder port 7 at the left rear side of the distributing block 2 will be communicated with the left exhaust port 6 via the passages 7' and 7'' and 6'' and 6'. It can thus be seen that if the spool 40 is moved to the right, the inlet port 8 will be communicated with the left cylinder port 7 via the passages 8' and 8'' and 7'' and 7' and the right cylinder port 9 will be communicated with the right exhaust port via the passages 9' and 9'' and 10'' and 10'.

To effect such movement of the spool 40 there is secured to the left end of the valve block 5 a pilot valve housing 50 to which, in turn, is attached the solenoid 51. The solenoid armature 52 constitutes (as disclosed in the aforesaid Lansky U.S. Pat. No. 3,232,312) a pilot valve which, when in the position shown (solenoid 51 de-energized), vents the chamber 53 through the then open exhaust passage 54 which registers with passage 55 in housing 50 communicating with exhaust chamber 56, and exhaust passage 57. When the solenoid 51 is energized, the pilot valve 52 closes the passage 54 and opens the pressure chamber 59 to chamber 53 whereby fluid pressure acting on the left-hand end of spool 40 moves the spool 40 to the right against the right bumper disk 37.

Between the pilot valve housing 50 and the adjacent end of the valve block 5 there is provided a molded gasket 65 which, in its as molded condition as shown in FIGS. 4 and 5, has circular rib means 66 with coaxial plugs 67 which are arranged to extend into the counterbored ends of the four openings 25,26, and 27;27 at that end of the valve block 5. In the illustrative example wherein the spool 40 is to be actuated by fluid pressure from the center pressure inlet passage 8'', the two upper plugs 67 (FIG. 4) will be removed to leave thereat just the surrounding rib means 66, and thus fluid under pressure in the through bore 25 may pass through the gasket 65 into a curved passage 68 in the pilot valve housing 50 regardless of which end of block 5 the gasket 65 is located. If the valve 1 is to be of the dual pressure type aforesaid, then the two lower plugs 67 (FIG. 4) will be removed to communicate with the arcuate or curved passage 68 in the pilot valve housing 50. In either case, the remaining two plugs 67 will fit in a blind hole 27 and in the unused lower or upper pressure supply passage 26 or 25.

The opposite side of the gasket 65 as shown in FIG. 5 has curved rib means 70 which seal around the curved horseshoe shaped passage 68 in the housing 50, said rib means 70 fitting into a correspondingly shaped groove 71 in the pilot valve housing 50. The groove 71 in the pilot valve housing 50 is of less depth than the height of the rib means 70 from the plane of the gasket 65 so that when the pilot valve housing 50 is secured to the valve block 5 as by means of the screws 72, the curved passage 68 in the housing will be isolated so that there can be no leakage past the rib means 70 of fluid brought in through the hole created by the removed plug 67. The curved passage 68 in the pilot valve housing 50 leads to the aforementioned pressure chamber 59 and when the pilot valve 52 is in the seated position shown in FIG. 1, the pressure in the chamber 59 is blocked and cannot reach the chamber 53. The pilot valve or armature 52 is urged to such seated position as by the spring 73 therearound. At that time, the other end of the pilot valve 52 opens the chamber 53 to the atmosphere through the passages 54 to 57 as previously explained. It is to be understood that the vent passage or chamber 56 may register with a passage (not shown) leading to the left exhaust passage 6''.

When the valve assembly 1 is used as, for example, in a vacuum system, or in a low pressure system in which the pressure is insufficient to actuate the valve spool 40 as aforesaid, a remote source of pilot pressure may be connected to the port 74 of pilot valve housing 50 in place of plug 75 and, in that case, all four plugs 67 of the gasket 65 will be left intact to isolate the vacuum or low pressure in the bore 25 from the curved pressure passage 68.

In the event of electrical failure or solenoid open or short circuit, it is to be understood that suitable override means may be provided to bypass the pilot valve 52 to conduct fluid pressure to chamber 53 and to vent the chamber 53.

If it be desired to mount the pilot valve assembly 50-51 or another identical assembly on the right-hand end of the valve block 5, the cap 28 and O-rings in openings 25 and 26 are removed whereupon a gasket 65 with the same upper or lower plugs 67 removed may be installed between said assembly 50-51 and the right-hand end of the valve block 5.

It can thus be seen that the simple form of gasket 65 as molded, can be adapted, by appropriate plug 67 removal, for uSe in mounting a solenoid pilot valve assembly 50-51 at either end or both ends of the valve block 5. The additional figure eight rib means 80 of gasket 65 (see FIG. 5) seal around the bore 35 of valve block 5 and around the electrical chamber 19 opening at the end of the valve block 5.

FIGS. 7 and 8 illustrate a modification of the FIG. 1 valve assembly in which the spool 40 and the bumper disk 37 have been modified to provide a detent mechanism for holding the spool 40 at its left or right operating positions.

The detent mechanism of FIGS. 7 and 8 comprises a detent rod 85 which is connected in the cavity 41 in the end of the spool 40 as by means of the snap ring 86 which engages the aforesaid groove 42 in the wall of the spool cavity 41. The detent rod 85 has a pair of axially spaced apart grooves 87 therein and instead of the bumper disk 37, a two-part spacer disk 88–89 is provided between which is disposed a hairpin type detent element 90 which spans into one groove 87 or the other depending on whether the spool 40 is in its left or right position. In this case, the spool 40 is actuated to its right position by momentary energization of the solenoid 51 and in order to shift the spool 40 to the left position from the position shown in FIG. 7, the distributing block 2 is provided with a remote air pressure source port 91 and a passage 92 through the plug 16 of the gasket 13 registers with a passage 93 in the valve block 5, and, in turn, the passage 93 registers with a groove or passage 94 in the modified cap 95 whereby pressure from the remote source may enter the pressure chamber 96 to act on the end of the detent rod 85 and on the end of the spool 40 to shift the spool to its left detent held position. A three-way valve or the like (not shown), may be connected to the remote port 91 to vent the chamber 96 so that pilot pressure acting on the left-hand end of the spool 40 will shift the spool 40 to its right detent held position.

In the event of pressure failure in port 91, the spool may be manually shifted back to its FIG. 7 position as by means of the plunger 97. It is to be understood that the spool 40 may be shifted to the right by means other than solenoid pilot valve 52 such as a direct acting solenoid means (FIGS. 9 and 10) or by fluid pressure with another cap 95 at the left end and another remote port 91.

FIG. 9 shows a direct acting solenoid 100 secured on the end of the valve block 5, the armature 101 of which acts on the end of an actuating rod 102 which is connected in the spool cavity 41 by the snap ring 86 in the same manner as the detent rod 85 aforesaid in FIGS. 8 and 9. A plate 103 is secured as by screws 104 to the end of the valve block 5 to seal against O-rings in the counterbored openings 25 and 26 in the end of the valve block 5. This plate 103 has the additional function of holding the spool 40, liner 36 and bumper disk 37 in the valve block 5 when the solenoid 100 is disconnected from the valve block 5. The cap of the valve block 5 may be the same valve cap 28 that is employed in FIG. 1, also to press O-rings into the counterbored openings at that end of the valve block. In connection with electrical failure or solenoid malfunction, the spool 40 in FIG. 9 may be manually shifted to the right by pushing in the adjacent plunger 105, locking being effected by turning the plunger 105 until its groove 106 engages the pin 107.

It is to be understood that another solenoid 100 may be mounted at the right end of the valve block 5 of FIG. 9 to provide a four-way two position direct solenoid operated spool with the right end of the spool having an actuator rod 102 secured thereto as by the snap ring 86. If such dual solenoid valve assembly is to be of the momentary contact type the detent mechanism of FIGS. 7 and 8 may be employed in place of one of the actuating rods 102.

In FIG. 10 there is illustrated a dual direct solenoid four-way three position valve assembly 110 in which (when both solenoids 100 are de-energized) the spool 111 is held by the springs 112 in its neutral position with both cylinder ports 7 and 9 blocked. As well known in the art, the spool 111 may be modified to communicate the cylinder ports 7 and 9 with the exhaust ports 6 and 10 when the spool 111 is in the spring-centered neutral position.

In FIG. 10 when the right solenoid 100 is energized to shift the spool 111 to the left, the actuator rod 113 at the left will move the left solenoid armature 101 toward the left. Accordingly, when the right solenoid 100 is then de-energized, the springs 112 operate to restore the spool 111 to centered position. If the spring 114 in the manual actuator were omitted, the left solenoid armature 101 would remain at its leftward shifted position. In that case, when the left solenoid 100 is subsequently energized the armature 101 would travel an initial distance before contacting the left actuator rod 113 and thus would pound against said rod causing wear and shock. Furthermore, there is a greater surge in electric current through the solenoid 100 when it is thus energized without load on the armature 101 thereof. It can thuS be seen that the spring 114 prevents this pounding and current surge by always returning the solenoid armature 101 to the neutral position when the spool 111 shifts to its neutral position. A similar spring 114 will be provided in the right-hand solenoid 100.

In the case of electrical or solenoid failure, either plunger 115 may be manually pushed in to engage the spring cup 116 and thus urge the armature 101 and spool 111 to a desired operating position.

A spacer member 117 is installed between each solenoid 100 and the adjacent end of the valve block 5 to provide for the opposite stroking of the spool 111 and the disks 118 have large diameter bores for movement of the spring cups 119 therein into and out of engagement with the bumpers 120. A still further modification of the present invention is shown in FIG. 11 wherein the valve construction may be substantially the same as that shown in FIG. 1 except for modification of the end cap 125 to effect fluid pressure return of the spool 40 to its left position upon de-energization of the solenoid 51. This is accomplished by attaching in the spring cavity 41 as by the snap ring 86, the rod of a piston 126 which is movable in the cylinder 127, the diameter of the piston 126 being less than the diameter of the spool 40 at its left end. If fluid pressure is obtained for rightward spool actuation from the through bore 25 of the valve block 5 that pressure is also conducted into the cylinder 127 via passage 128 and when the solenoid 51 is energized, the pilot pressure in acting on the left end of the spool 40 will shift the spool 40 toward the right in opposition to the same pressure acting on the smaller area of the piston 126 at the right end of the spool 40. Now, when the solenoid 51 is de-energized, the armature 52 opens the vent passage 54 so that the chamber 53 is vented, whereupon the fluid pressure acting on the smaller piston 126 urges the spool 40 to the left position with the assistance of the spring 129. Of course, if the bores 26 are the pressure passages, then the cylinder 127 will get actuating pressure via passage 130. The unused pressure supply passage will be plugged.

Other modes of applying the principle of the invention may be employed, change being made as regards the details described, provided the features stated in any of the following claims, or the equivalent of such, be employed.

We therefore particularly point out and distinctly claim as our invention:

1. A sealing unit comprising a sheet-like resilient gasket member having an aperture therethrough bounded on one side only by lateral rib means; and a plate member of uniform thickness adjacent said one side of said gasket member having an aperture therethrough through which said rib means extends, said rib means being of height exceeding the thickness of said plate member whereby said gasket member is squeezed at said rib means when said unit is clamped between mating parts having parallel faces respectively engaged by said plate member and rib means and only the other side of said gasket member.

2. A sealing unit comprising a sheet-like resilient gasket member having an aperture therethrough bounded on one side by lateral rib means; and a plate member of uniform thickness adjacent said one side of said gasket member having an aperture therethrough through which said rib means extends, said rib means being of height exceeding the thickness of said plate member whereby said gasket member is squeezed at said rib means when said unit is clamped between mating parts having parallel faces respectively engaged by said plate member and rib means and the other side of said gasket member; said gasket member having a lateral projection on said one side extending snugly through another aperture in said plate member, said projection exceeding the thickness of said plate member and being adapted to extend into a cavity of the adjacent mating part engaged by said plate member thus to locate said unit between such mating parts.

3. A sealing unit comprising a resilient gasket member having an aperture therethrough bounded by lateral rib means; and a plate member adjacent one side of said gasket having an aperture therethrough through which said rib means extends, said rib means being of height exceeding the thickness of said plate member whereby said gasket member is squeezed at said rib means when said unit is clamped between mating parts; said gasket member having a lateral projection extending snugly through another aperture in said plate member, said projection being adapted to extend into a cavity of the adjacent mating part thus to locate said unit between such mating parts; said lateral projection having a passage therethrough for flow of fluid.

4. A sealing unit for sealing the joint between mating parts having a plurality of registering passages in their mating parallel faces, said unit comprising a sheet-like resilient gasket member having a corresponding plurality of apertures therethrough bounded on one side only by respective lateral rib means; and a plate member of uniform thickness having a corresponding plurality of apertures therethrough through which the respective rib means extend, said rib means being of height exceeding the thickness of said plate member whereby said gasket member is squeezed at said rib means when said unit is clamped between such mating parts with said plate member and rib means and only the other side of said gasket member engaged with the respective mating faces.

5. A sealing unit for sealing the joint between mating parts having a plurality of registering passages in their mating parallel faces, said unit comprising a sheet-like resilient gasket member having a corresponding plurality of apertures therethrough bounded on one side by respective lateral rib means; and a plate member of uniform thickness having a corresponding plurality of apertures therethrough through which the respective rib means extend, said rib means being of height exceeding the thickness of said plate member whereby said gasket member is squeezed at said rib means when said unit is clamped between such mating parts with said plate member and rib means and the other side of said gasket member engaged with the respective mating faces; said gasket member having spaced apart lateral projections on said one side which extend snugly through corresponding other apertures in said plate member, said projections exceeding the thickness of said plate member and being adapted to extend into corresponding cavities of the adjacent mating part thus to locate said unit between such mating parts.

6. A sealing unit for sealing the joint between mating parts having a plurality of registering passages in their mating faces, said unit comprising a resilient gasket member having a corresponding plurality of apertures therethrough bounded by respective lateral rib means; and a plate member having a corresponding plurality of apertures therethrough through which the respective rib means extend, said rib means being of height exceeding the thickness of said plate member whereby said gasket member is squeezed at said rib means when said unit is clamped between such mating parts; said gasket member having spaced apart lateral projections which extend snugly through corresponding other apertures in said plate member; said projections being adapted to extend into corresponding cavities of the adjacent mating part thus to locate said unit between such mating parts; one of said lateral projections having a passage therethrough for flow of fluid.

* * * * *